United States Patent
Nakamata et al.

(10) Patent No.: US 8,483,143 B2
(45) Date of Patent: Jul. 9, 2013

(54) RECONFIGURATION OF FRACTIONAL DEDICATED CHANNEL SLOT FORMAT

(75) Inventors: Masatoshi Nakamata, Kawasaki (JP); Karri Ranta-aho, Espoo (FI)

(73) Assignee: Nokia Corporation, Espoo (FI)

( * ) Notice: Subject to any disclaimer, the term of this patent is extended or adjusted under 35 U.S.C. 154(b) by 1268 days.

(21) Appl. No.: 12/217,484

(22) Filed: Jul. 3, 2008

(65) Prior Publication Data

US 2009/0073953 A1 Mar. 19, 2009

Related U.S. Application Data

(60) Provisional application No. 60/958,596, filed on Jul. 6, 2007.

(51) Int. Cl.
*H04W 4/00* (2009.01)
*H04W 72/00* (2009.01)
*H04B 7/00* (2006.01)

(52) U.S. Cl.
USPC ........... 370/329; 370/338; 370/341; 455/450; 455/509

(58) Field of Classification Search
USPC .................. 370/329, 338, 341; 455/450, 509
See application file for complete search history.

(56) References Cited

U.S. PATENT DOCUMENTS

| | | | |
|---|---|---|---|
| 5,933,418 A | 8/1999 | Massingill et al. | 370/321 |
| 6,829,482 B2 * | 12/2004 | Rune et al. | 455/442 |
| 6,934,526 B2 * | 8/2005 | Choi et al. | 455/403 |
| 6,941,132 B2 * | 9/2005 | Van Lieshout et al. | 455/418 |
| 6,947,446 B2 | 9/2005 | LoGalbo et al. | 370/468 |
| 6,996,069 B2 * | 2/2006 | Willenegger | 370/252 |
| 7,020,126 B2 * | 3/2006 | Choi et al. | 370/342 |
| 7,031,277 B2 * | 4/2006 | Choi et al. | 370/331 |
| 7,292,868 B2 | 11/2007 | Laroia et al. | 455/458 |
| 7,509,127 B2 * | 3/2009 | Wang et al. | 455/439 |
| 7,535,882 B2 * | 5/2009 | Kim | 370/338 |
| 7,539,493 B2 * | 5/2009 | Kwak et al. | 455/436 |
| 7,773,994 B2 * | 8/2010 | Jeong et al. | 455/442 |
| 8,374,598 B2 * | 2/2013 | Ke | 455/424 |
| 2002/0031189 A1 | 3/2002 | Hiben et al. | 375/260 |
| 2002/0126648 A1 | 9/2002 | Kuchi et al. | 370/347 |
| 2003/0133429 A1 * | 7/2003 | Choi et al. | 370/342 |
| 2003/0161471 A1 | 8/2003 | Jou et al. | 380/268 |
| 2003/0185159 A1 * | 10/2003 | Seo et al. | 370/278 |
| 2004/0022213 A1 * | 2/2004 | Choi et al. | 370/332 |

(Continued)

OTHER PUBLICATIONS

3GPP TS 25.211. V7.0.0 (Mar. 2006), $3^{rd}$ generation partnership project; technical specification group radio access network; physical channels and mapping of transport channels onto physical channels (FDD) (release 7), 50 pgs.

(Continued)

*Primary Examiner* — Alpus H Hsu
(74) *Attorney, Agent, or Firm* — Harrington & Smith

(57) ABSTRACT

During a radio link setup or reconfiguration or addition procedures, a serving radio network controller SRNC sends a request or prepare message to a drift radio network controller DRNC with a slot format information element IE, to which the DRNC sends a reply. During a physical channel reconfiguration process the DRNC sends a request to the SRNC with the slot format IE. In all cases, the DRNC uses the IE to determine the slot format for its fractional dedicated physical channel, and reconfigures it with the node B according to the IE.

31 Claims, 4 Drawing Sheets

U.S. PATENT DOCUMENTS

| | | | | |
|---|---|---|---|---|
| 2004/0258084 | A1 | 12/2004 | Laroia et al. | 370/437 |
| 2005/0068990 | A1* | 3/2005 | Liu | 370/516 |
| 2005/0163075 | A1 | 7/2005 | Malladi et al. | 370/329 |
| 2005/0208961 | A1 | 9/2005 | Willenegger | 455/522 |
| 2005/0281222 | A1* | 12/2005 | Ranta-Aho et al. | 370/328 |
| 2005/0282569 | A1* | 12/2005 | Kim et al. | 455/502 |
| 2006/0262840 | A1* | 11/2006 | Wang et al. | 375/221 |
| 2007/0104167 | A1* | 5/2007 | Nakamata et al. | 370/338 |
| 2007/0140162 | A1* | 6/2007 | Taylor | 370/329 |
| 2007/0177494 | A1 | 8/2007 | Tomizawa | 370/208 |
| 2007/0178902 | A1* | 8/2007 | Guethaus et al. | 455/442 |
| 2007/0259682 | A1* | 11/2007 | Kaikkonen et al. | 455/522 |
| 2008/0049655 | A1* | 2/2008 | Lundby et al. | 370/311 |
| 2008/0049683 | A1* | 2/2008 | Nakamata et al. | 370/335 |
| 2008/0123585 | A1* | 5/2008 | Granzow et al. | 370/320 |
| 2008/0198763 | A1* | 8/2008 | Fischer et al. | 370/254 |
| 2010/0208682 | A1* | 8/2010 | Ranta-Aho et al. | 370/329 |

OTHER PUBLICATIONS

3GPP TSG-RAN WG3 Meeting #56, RP-070758, Kobe, Japan, May 7-11, 2007, Change Request, 119 pgs.

3GPP TSG-RAN WG1 #48, R1-070809, St. Louis, USA, Feb. 12-16, 2007, 3 pgs.

3GPP TSG-RAN WG1 #48, R1-070811, Feb. 12-16, 2007, St. Louis, MO, USA, 3 pgs.

3GPP TSG-RAN WG1 #47bis, R1-070416, Jan. 15-19, 2007, Sorrento, Italy, 5 pgs.

3GPP TSG-RAN WG1 #48, R1-071143, St. Louis, USA, Feb. 12-16, 2007, 7 pgs.

3GPP TS 25.423 v.7.4.0 (Mar. 2007), $3^{rd}$ Generation Partnership Project; Technical Specification Group Radio Access Network; UTRAN Iur interface RNSAP signaling (Release 7), 147 pgs.

"Universal Mobile Telecommunications System (UMTS); UTRAN Iur Interface Radio Network Subsystem Application Part (RNSAP) signaling (3GPP TS 25.423 version 7.5.0 Release 7); ETSI TS 125 423", ETSI Standards, Cedex France, Jun. 1, 2007, pp. 1-813.

Nortel Networks: "Potential Impacts of Fractional DPCH on Iub/Iur", R3-041144, 3GPP TSG-RAN3 #43 Meeting, Aug. 16-20, 2004, Prague, Czech Republic.

Nokia, Nokia Siemens Networks: "Corrections for F-DPCH Slot Format Operation" [Online] No. R3-071648, 3GPP TSG-RAN WG3 Meeting #57, Aug. 20-24, 2007, Athens, Greece, XP-002506483, Retrieved from the Internet on Dec. 1, 2008: URL:http://www.3gpp.org/ftp/TSG_RAN/WG3_Iu/TSGR3_57/docs.

* cited by examiner

F-DPCH FIELDS

| SLOT FORMAT #i | CHANNEL BIT RATE (kbsps) | CHANNEL SYMBOL RATE (ksps) | SF | BITS/SLOT | $N_{OFF1}$ BITS/SLOT | $N_{TPC}$ BITS/SLOT | $N_{OFF2}$ BITS/SLOT |
|---|---|---|---|---|---|---|---|
| 0 | 3 | 1.5 | 256 | 20 | 2 | 2 | 16 |
| 1 | 3 | 1.5 | 256 | 20 | 4 | 2 | 14 |
| 2 | 3 | 1.5 | 256 | 20 | 6 | 2 | 12 |
| 3 | 3 | 1.5 | 256 | 20 | 8 | 2 | 10 |
| 4 | 3 | 1.5 | 256 | 20 | 10 | 2 | 8 |
| 5 | 3 | 1.5 | 256 | 20 | 12 | 2 | 6 |
| 6 | 3 | 1.5 | 256 | 20 | 14 | 2 | 4 |
| 7 | 3 | 1.5 | 256 | 20 | 16 | 2 | 2 |
| 8 | 3 | 1.5 | 256 | 20 | 18 | 2 | 0 |
| 9 | 3 | 1.5 | 256 | 20 | 0 | 2 | 18 |

9.1.21 PHYSICAL CHANNEL RECONFIGURATION REQUEST
9.1.21.1 FDD MESSAGE

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.2.1.40 | | YES | REJECT |
| TRANSACTION ID | M | | 9.2.1.59 | | – | – |
| RL INFORMATION | M | 1 | | | YES | REJECT |
| >RL ID | M | | 9.2.1.49 | | – | – |
| >DL CODE INFORMATION | M | | FDD DL CODE INFORMATION 9.2.2.14A | | YES | NOTIFY |

9.2.2.14A FDD DL CODE INFORMATION
THE FDD DL CODE INFORMATION IE PROVIDES FDD DL CODE INFORMATION FOR ALL DPCHs OR FOR THE F-DPCH OF ONE RADIO LINK

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| FDD DL CODE INFORMATION | | | | | – | – |
| >DL SCRAMBLING CODE | M | | 9.2.2.11 | | – | – |
| >FDD DL CHANNELISATION CODE NUMBER | M | | 9.2.2.14 | | – | – |
| >TRANSMISSION GAP PATTERN SEQUENCE SCRAMBLING CODE INFORMATION | O | | | | | |
| >>F-DPCH SLOT FORMAT | O | | 9.2.2.47B | | – | – |
| >>F-DPCH FRAME OFFSET | O | | | | | |

| RANGE BOUND | EXPLANATION |
|---|---|
| MAXNOOFDLCODES | MAXIMUM NUMBER OF DL CHANNELISATION CODES FOR ONE UE |

FIG.3

RECONFIGURATION OF FRACTIONAL DEDICATED CHANNEL SLOT FORMAT

PRIORITY CLAIM

This patent application claims priority from U.S. Provisional Patent Application No.: 60/958,596, filed Jul. 6, 2007, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques for setting and changing a slot format for a user equipment from a network element.

BACKGROUND

Various abbreviations that appear in the specification and/or in the drawing figures are defined as follows:
3GPP third generation partnership project
BSS base station subsystem
CN core network
CRNC controlling RNC
DBSS drift BSS
DL downlink
DPC downlink power control
DPCH dedicated physical channel
DRNC drift RNC
DRNS drift RNS
DSCH downlink shared channel
FDD frequency division duplex
F-DPCH fractional DPCH
IE information element
Iub interface between the RNC and a Node B
Iur logical interface between two RNC
Node B base station
P-CCPCH primary common control physical channel
P-CPICH primary common pilot channel
RAN radio access network
RL radio link
RLC radio link control
RNC radio network controller
RNS radio network subsystem
RNSAP radio network subsystem application part
RRC radio resource control
SAS stand-alone serving mobile location centre
SBSS serving BSS
S-CCPCH secondary common control physical channel
SCH synchronisation channel
SHO soft handover
SRNC serving RNC
SRNS serving RNS
TDD time division duplex
TPC transmit power control
TS time slot
UE user equipment
UL uplink
UMTS universal mobile telecommunications system
UTRA universal terrestrial radio access
UTRAN universal terrestrial radio access network
WCDMA wideband code division multiple access In 3GPP Rel-7 (release 7) it was agreed to introduce a change to the Rel-6 (release 6) Fractional DPCH. The DPCH is a DL channel in which at most 10 UEs can time-share one DL channelization code for power control command delivery. The change involved removing a SHO timing restriction that was present in Rel-6. The enhancement was made so that the DL slot format of the F-DPCH may be chosen to be one of ten, which places the TPC symbol to one of the ten symbol positions in the DL slot.

Reference in this regard can be made to R1-070809, 3GPP TSG-RAN WG1 #48, St. Louis, USA, 12th-16th Feb., 2007, Change Request 25.211 CR232, rev. 2, Qualcomm Europe, attached to the above-referenced priority document as Exhibit A. The introduction of new slot formats was to allow the placement of the TPC symbol anywhere in the DL F-DPCH slot. The motivation for making this change was presented in R1-070811, 3GPP TSG-RAN WG1 #48, St. Louis, USA, 12th-16th Feb., 2007, "Benefits of DL code utilization with enhanced F-DPCH" Qualcomm Europe, attached to the above-referenced priority document as Exhibit B.

FIGS. 1C and 1D herein reproduce FIGS. 12B, Frame Structure for F-DPCH, and Table 16C, F-DPCH Fields, respectively, of R1-070809, and show that the TPC symbol (2 TPC bits) can assume any of the 10 symbol positions in a slot (as defined by slot format #0-#9).

In the SHO case each radio link may obtain a different F-DPCH slot format and thus different TPC symbol timing in the DL. However, due to power control timing it would be beneficial if the TPC symbol timing in all the radio links being received by a single UE would be similar, since if the timing difference is large the power control loop can experience a longer delay.

Further reference in this regard can be made to R1-070416, 3GPP TSG-RAN WG1 #47 bis, Sorrento, Italy, Jan. 15th-19th, 2007, "UL system analysis with proposed new F-DPCH" Qualcomm Europe, attached to the above-referenced priority document as Exhibit C. This publication describes why a large time difference in the TPC commands received by the UE in SHO from two different radio links leads to a two slot power control delay, while a smaller time difference leads to only a one slot power control delay.

It has been assumed that the CRNC determines the F-DPCH slot format for each RL established for the UE since it is the CRNC that allocates the channelization code used for the channel. Since the slot format is related to the channelization code, it may be assumed that the F-DPCH slot format is also changed when the code allocated to the F-DPCH is changed.

However, the inventors have realized that as currently specified it is not possible to change the F-DPCH slot format for the UE over the Iur by the DRNC, since in the Rel-6 specification there was only one slot format allowed for the F-DPCH, and furthermore the timing of multiple radio links was required to be within +/−148 chips from one another (approximately one tenth of a symbol time). Additionally, when adding a new radio link there is no mechanism specified that would facilitate attempting to allocate the DL F-DPCH timing of the RL being added so as to be close to the existing RL timings.

SUMMARY

In accordance with an exemplary embodiment of the invention is a method that includes sending from a drift network element to a serving network element a request that comprises an indication of a slot format for a fractional dedicated channel, and in response to the request being granted, the drift network element setting the slot format of the fractional dedicated channel according to the indication.

In accordance with another exemplary embodiment of the invention is a memory storing a program of computer readable instructions executable by a processor to perform actions directed to setting a slot format. In this embodiment the actions include sending from a drift network element to a serving network element a request that comprises an indication of a slot format for a fractional dedicated channel, and in response to the request being granted, the drift network element setting the slot format of the fractional dedicated channel according to the indication.

In accordance with still another exemplary embodiment of the invention is an apparatus that includes a processor and a memory storing a program. The processor is configured to send over a communications interface to a serving network element a request that comprises an indication of a slot format for a fractional dedicated channel, and in response to the request being granted, the processor is configured to set the slot format of the fractional dedicated channel according to the indication.

In accordance with yet another exemplary embodiment of the invention is an apparatus that includes processing means (e.g., a processor) and communication means (e.g., a modem for communicating over an Iur interface) for sending to a serving network element a request that comprises an indication of a slot format for a fractional dedicated channel, and in response to the request being granted, for setting the slot format of the fractional dedicated channel according to the indication.

In accordance with an exemplary embodiment of the invention is a method that includes receiving at a serving network element from a drift network element a request that comprises an indication of a slot format for a fractional dedicated channel, and granting the request and the serving network element switching a slot format of the fractional dedicated channel to the slot format of the indication.

In accordance with another exemplary embodiment of the invention is a memory storing a program of computer readable instructions executable by a processor to perform actions directed to setting a slot format. In this embodiment the actions include, in response to receiving at a serving network element from a drift network element a request that comprises an indication of a slot format for a fractional dedicated channel, granting the request and the serving network element switching a slot format of the fractional dedicated channel to the slot format of the indication.

In accordance with still another exemplary embodiment of the invention is an apparatus that includes a processor and a memory storing a program. The processor is configured to receive over a communications interface from a drift network element a request that comprises an indication of a slot format for a fractional dedicated channel, and to send over the communications interface a grant of the request and further configured to switch a slot format of the fractional dedicated channel to the slot format of the indication In accordance with still another exemplary embodiment of the invention is an apparatus that includes processing means (e.g., a processor) and program storage means (e.g., a computer readable memory storing a program) and communication means (e.g., a modem for communicating over an Iur interface). The processor is for receiving, via the communication means from a drift network element, a request that comprises an indication of a slot format for a fractional dedicated channel, and the processing means is further for sending via the communication means a grant of the request and is further for switching a slot format of the fractional dedicated channel to the slot format of the indication.

In accordance with another embodiment of the invention is a method that includes receiving at a drift network element from a serving network element a message that comprises an indication of a slot format for a fractional dedicated channel, and sending a reply to the message and using the indication to determine the slot format of the fractional dedicated channel.

In accordance with another embodiment of the invention is an apparatus that includes a processor and a memory storing a program. The processor is configured to receive from a serving network element a message that comprises an indication of a slot format for a fractional dedicated channel, and is further configured to send a reply to the message and to use the indication to determine the slot format of the fractional dedicated channel.

In accordance with another embodiment of the invention is a memory storing a program of computer readable instructions executable by a processor to perform actions directed to setting a slot format. In this embodiment the actions include, in response to receiving at a drift network element from a serving network element a message that comprises an indication of a slot format for a fractional dedicated channel, sending a reply to the message and using the indication to determine the slot format of the fractional dedicated channel.

In accordance with another embodiment of the invention is an apparatus that includes processing means (e.g., a processor) and program storage means (e.g., a memory storing a program) and communication means (e.g., a modem). The processing means is for receiving, via the communication means from a serving network element, a message that comprises an indication of a slot format for a fractional dedicated channel. The processing means is further for sending via the communication means a reply to the message, and for using the indication to determine the slot format of the fractional dedicated channel.

In accordance with another embodiment of the invention is a method that includes sending from a serving network element to a drift network element a message that comprises an indication of a slot format for a fractional dedicated channel, and receiving a reply to the message.

In accordance with yet another exemplary embodiment of the invention is an apparatus that includes a processor and a memory storing a program. The processor is configured to send to a drift network element a message that comprises an indication of a slot format for a fractional dedicated channel. The processor is further configured to receive a reply to the message.

In accordance with still another embodiment of the invention is a memory storing a program of computer readable instructions executable by a processor to perform actions directed to setting a slot format. In this embodiment the actions include sending from a serving network element to a drift network element a message that comprises an indication of a slot format for a fractional dedicated channel, and receiving a reply to the message.

In accordance with yet another exemplary embodiment of the invention is an apparatus that includes processing means (e.g., a processor) and communication means (e.g., a modem for communicating over an Iur interface) and communication means (e.g., a memory storing a program). The processing means is for sending via the communication means to a drift network element a message that comprises an indication of a slot format for a fractional dedicated channel, and the processing means is further for receiving a reply to the message via the communication means.

BRIEF DESCRIPTION OF THE DRAWINGS

FIG. 3 shows modifications made to Iur signaling messages in accordance with exemplary embodiments of this invention.

DETAILED DESCRIPTION

General reference with regard to an exemplary system architecture of interest to the embodiments of this invention may be made to ETSI TS 125 401 (V7.0.0 (2006-03)), "Universal Mobile Telecommunications System (UMTS); UTRAN overall description (3GPP TS 25.401 version 7.0.0 Release 7)", attached to the above-referenced priority document as Exhibit D.

Figure 1A:
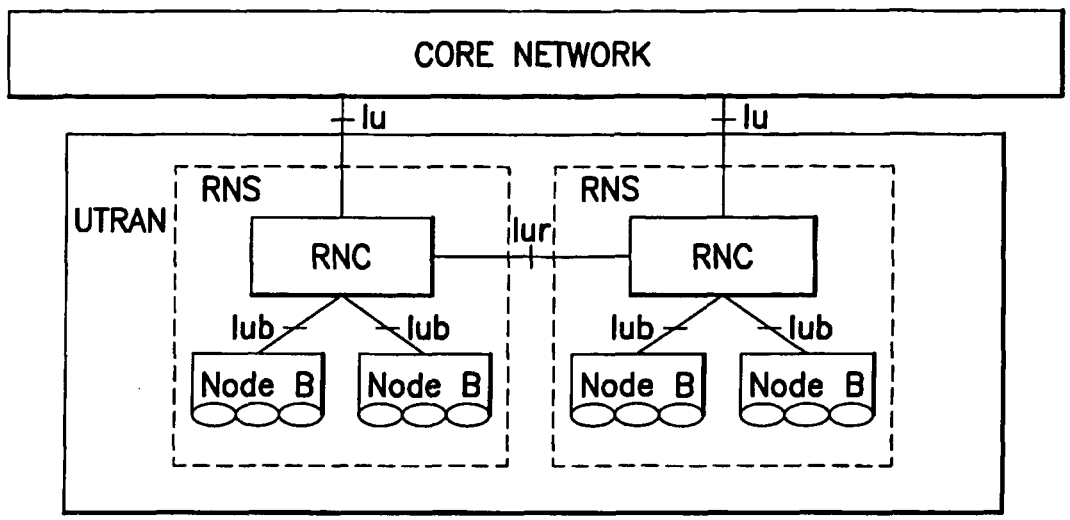
FIG. 1A shows the UTRAN architecture.
Figure 1B:
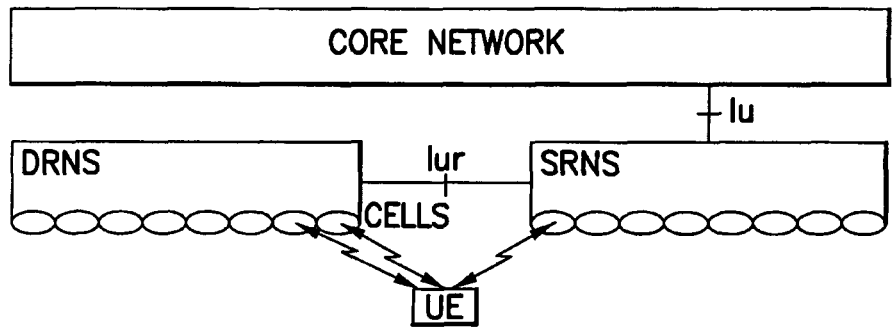
FIG. 1B shows a serving and a drift RNS.

Reference can be made first to FIG. 1A, which reproduces FIG. 4 of 3GPP TS 25.401 (Exhibit D of the priority document) and which shows the UTRAN architecture, and to FIG. 1B, which reproduces FIG. 5 of 3GPP TS 25.401 (Exhibit D) and which shows a serving and a drift RNS. In general, each RNS is responsible for the resources of its set of cells. For each connection between a UE and the UTRAN, one RNS is the serving RNS. When required, drift RNSs support the serving RNS by providing radio resources. The role of an RNS (serving or drift) is on a per connection basis between a UE and the UTRAN. One RNS includes a RNC and one or more Node Bs, and may include a SAS. If a RNC is associated with a drift RNS, then it is referred to as a drift RNC (DRNC).

Figure 2:
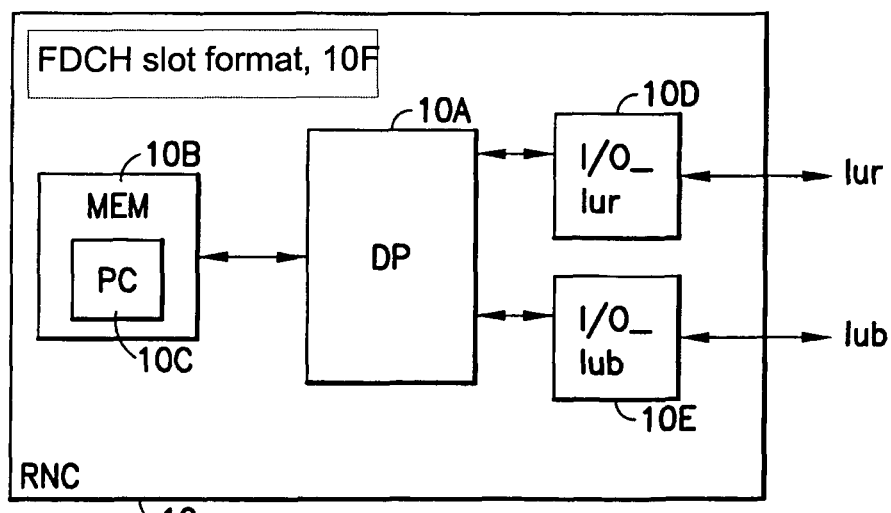
FIG. 2 shows a simplified block diagram of various electronic devices that are suitable for use in practicing the exemplary embodiments of this invention.
Figures 1C, 1D:
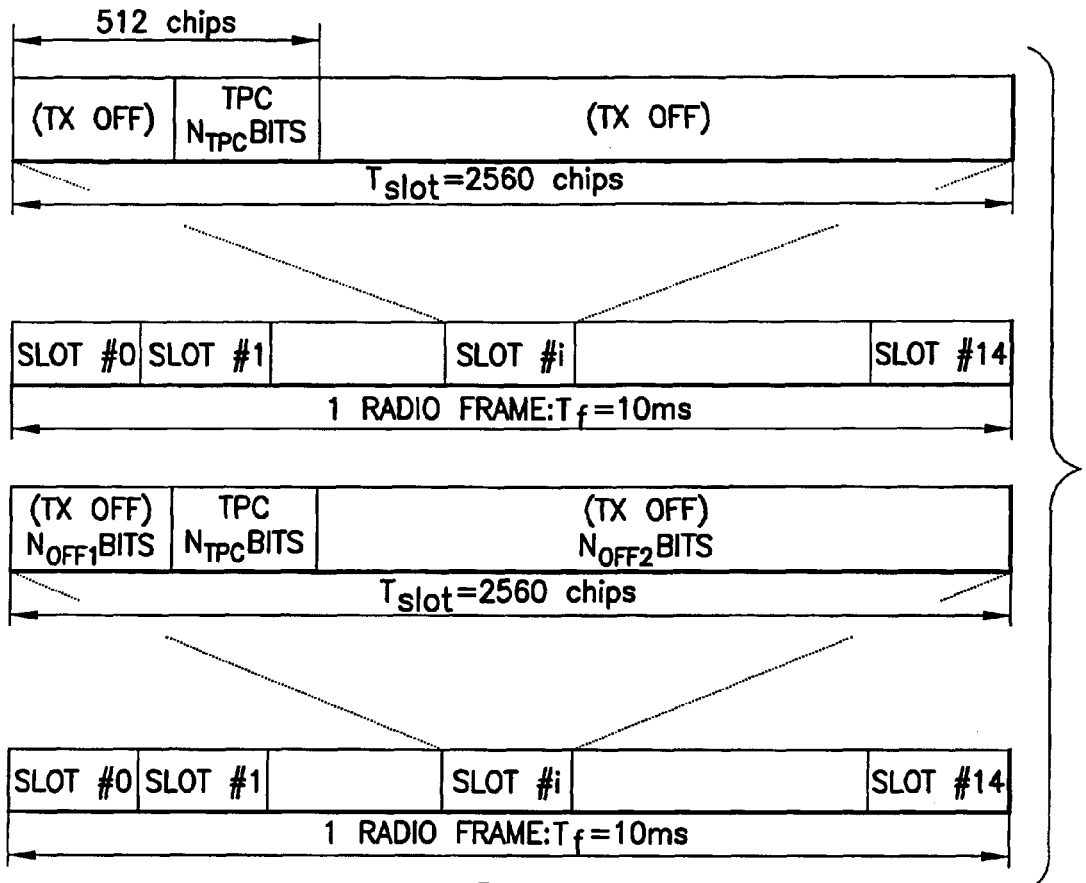
FIGS. 1C and 1D reproduce figure 12B, Frame Structure for F-DPCH, and Table 16C, F-DPCH Fields, respectively, of R1-070809 (Exhibit A of the priority document).

FIG. 2 depicts an example of a RNC 10 (serving or drift), which is shown to include at least one suitable data processor (DP 10A), at least one suitable memory (MEM) 10B storing program code (PC) 10C for directing the operation of the data processor 10A in controlling the RNC 10. The RNC 10 includes an interface (I/O_Iur) 10D for implementing the Iur interface with another RNC (see FIG. 1A), and well as at least one interface (I/O_Iub) 10E for implementing the Iub interface with a Node B.

The PC 10C is assumed to include program instructions that, when executed by the associated DP 10A, enable the RNC 10 to operate in accordance with the exemplary embodiments of this invention, as will be discussed below in greater detail.

The exemplary embodiments of this invention may be implemented at least in part by computer software executable by the DP 10A, or by hardware, or by a combination of software and hardware, as generally shown by the functional block 10F which is a fractional dedicated physical channel F-DPCH slot format.

In general, the various embodiments of the UE shown in FIG. 1B can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEM 10B may be of any type suitable to the local technical environment and may be implemented using any suitable data storage technology, such as semiconductor-based memory devices, flash memory, magnetic memory devices and systems, optical memory devices and systems, fixed memory and removable memory. The DP 10A may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention relate generally to 3GPP WCDMA radio access, and more specifically to reconfiguration of the F-DPCH slot format by the DRNC.

The use of the exemplary embodiments of this invention assumes that there is an ability for the DRNC to restructure its F-DPCH codes by requesting the SRNC to reconfigure the F-DPCH code. The use of the exemplary embodiments of this invention beneficially provide in a first aspect thereof an ability to reconfigure the slot format of the F-DPCH, as described in detail below.

The use of the exemplary embodiments of this invention further allows, in a second aspect of this invention, the SRNC to indicate to the DRNC what is the 'preferred' timing (F-DPCH slot format and/or frame timing) when a new radio link is being set up.

Discussing now the exemplary embodiments of this invention in greater detail, in accordance with the first aspect of this invention there is provided a new E (or IEs) referred to for convenience, and not as a limitation, as the F-DPCH Slot Format, and $\tau_{F\text{-}DPCH}$, to the RNSAP: PHYSICAL CHANNEL RECONFIGURATION REQUEST.

Also provided, in accordance with the second aspect of this invention, is a new IE referred to for convenience, and not as a limitation, as the Preferred F-DPCH Slot Format, and $\tau_{F\text{-}DPCH}$, to the RNSAP: RADIO LINK SETUP REQUEST, RADIO LINK ADDITION REQUEST, RADIO LINK RECONFIGURATION PREPARE and RADIO LINK RECONFIGURATION REQUEST, where the IEs indicate a 'preferred' F-DPCH timing.

Also provided, in accordance with the second aspect of this invention, is a new E referred to for convenience, and not as a limitation, as the $\tau_{F\text{-}DPCH}$ to the RNSAP: RADIO LINK SETUP RESPONSE, RADIO LINK ADDITION RESPONSE, RADIO LINK RECONFIGURATION READY and RADIO LINK RECONFIGURATION RESPONSE, where the IEs indicate the F-DPCH timing of the newly setup channel.

It should be noted that the F-DPCH Slot format is also signaled by the SRNC.

The F-DPCH slot format and $\tau_{F\text{-}DPCH}$ (which defines the F-DPCH frame offset relative to the cell's P-CCPCH) would be sufficient to signal the slot format and set the $\tau_{F\text{-}DPCH}$ to a known value, but it is within the scope of the exemplary embodiments of this invention to signal both. General reference in this regard may be made to section 7.1 of 3GPP TS 25.211 (V7.0.0 (2006-03), 3rd Generation Partnership Project; Technical Specification Group Radio Access Network; Physical channels and mapping of transport channels onto physical channels (FDD) (Release 7), which is attached to the above-referenced priority document as Exhibit E.

Further now with regard to the first aspect of this invention, when the DRNC 10 desires to change a value of the F-DPCH Slot Format, the DRNC includes the new IE into the RNSAP:

PHYSICAL CHANNEL RECONFIGURATION REQUEST, in similar manner with reconfiguration of the DL Code. If the change is acceptable for the SRNC, the SRNC sends the RNSAP: PHYSICAL CHANNEL RECONFIGURATION COMMAND to the DRNC. After reception of the RNSAP: PHYSICAL CHANNEL RECONFIGURATION COMMAND the DRNC reconfigures the F-DPCH Slot Format in the Node B.

Related to the foregoing paragraph, and as a further embodiment, it is possible to utilize the RL Parameter Update procedure with the introduction of the F-DPCH Slot Format. However, this embodiment is less preferred than the utilization of Physical Channel Reconfiguration procedure.

When the SRNC desires to set up a new radio link via the DRNC the DRNC is responsible for allocating the F-DPCH slot format and timing. However, it is beneficial to have the new RL's timing closely match the existing RL timing, and thus the SRNC needs to provide the indication of the 'preferred' slot format and channel frame timing to the DRNC so as to enable the DRNC to know which choice(s) are close to the existing RL timings.

An exemplary implementation of the invention is shown in FIG. 3, which shows the addition of the DL Code Information IE to the FDD message of the PHYSICAL CHANNEL RECONFIGURATION REQUEST, comprising the FDD DL Code Information, and the format of the corresponding FDD DL Code Information format that includes the F-DPCH Slot Format and F-DPCH Frame Offset IEs. Reference in this regard can be made to 3GPP TS 25.423, V7.4.0 (2007-03), 3rd Generation Partnership Project; Technical Specification Group Radio Access Network; UTRAN Iur interface RNSAP signalling (Release 7), Sections 9.1 and 9.2, which show the conventional Physical Channel Reconfiguration Request message format and the format of the FDD DL Code Information IE.

A clear advantage that is gained by the use of the exemplary embodiments of this invention is that but minor modifications are made to pre-existing message formats and signaling structures that appear on the Iur.

Figure 4A:
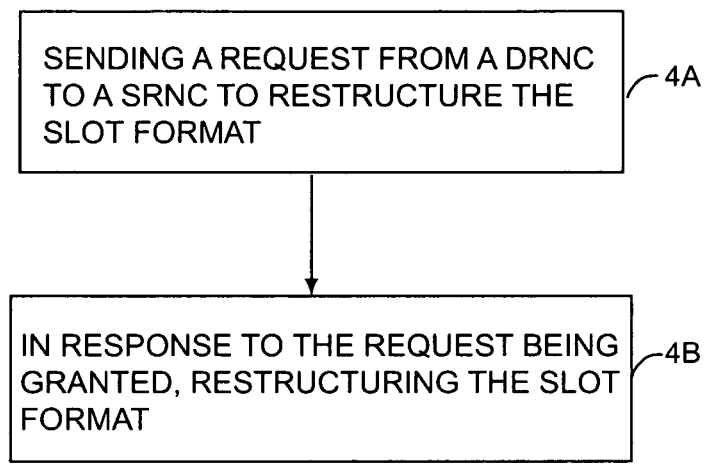
FIG. 4(a) shows a logic flow diagram in accordance with a method, and the operation of a computer program product, in accordance with exemplary embodiments of this invention.
Figure 4B:
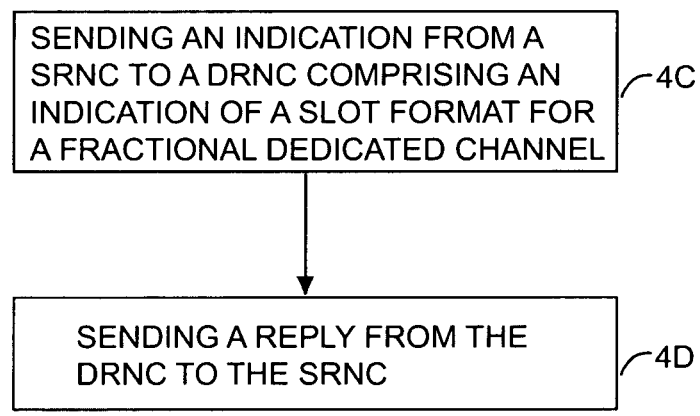
FIG. 4(b) shows a logic flow diagram in accordance with a method, and the operation of a computer program product, in accordance with exemplary embodiments of this invention.

Based on the foregoing it should be apparent that the exemplary embodiments of this invention provide a method, apparatus and computer program product(s), as shown in FIG. 4(a) to send a request from a DRNC to a SRNC to restructure the F-DPCH slot format (Block 4A), and in response to the request being granted, to restructure the F-DPCH slot format (Block 4B). Based on the foregoing it should also be apparent that exemplary embodiments of this invention provide a method, apparatus and computer program product(s), as shown in FIG. 4(b) to send an indication from a SRNC to a DRNC comprising an indication of a slot format for a fractional dedicated channel (Block 4C), and to send a reply from the DRNC to the SRNC (Block 4D).

The method, apparatus and computer program product of the preceding paragraph, where at least one IE comprising a F-DPCH Slot Format, and $\tau_{F\text{-}DPCH}$, is added to the RNSAP: PHYSICAL CHANNEL RECONFIGURATION REQUEST.

Based on the foregoing it should also be apparent that the exemplary embodiments of this invention provide a method, apparatus and computer program product(s) to enable the SRNC to indicate to the DRNC what is a preferred timing (F-DPCH slot format and/or frame timing) when a new radio link is being set up.

The method, apparatus and computer program product of the preceding paragraph, where a Preferred F-DPCH Slot Format, and $\tau_{F\text{-}DPCH}$, at least one IE is added to the RNSAP: RADIO LINK SETUP REQUEST, RADIO LINK ADDITION REQUEST, RADIO LINK RECONFIGURATION PREPARE and RADIO LINK RECONFIGURATION REQUEST, where the at least one IE indicates the preferred F-DPCH timing.

The method, apparatus and computer program product of the preceding paragraphs, where a $\tau_{F\text{-}DPCH}$ IE is added to the RNSAP: RADIO LINK SETUP RESPONSE, RADIO LINK ADDITION RESPONSE, RADIO LINK RECONFIGURATION READY and RADIO LINK RECONFIGURATION RESPONSE, where the IE indicates the F-DPCH timing of a newly setup radio link.

The various blocks in FIG. 4(a) and FIG. 4(b) may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UMTS, UTRAN system, it should be appreciated that the exemplary embodiments of this invention are not limited for use with only this one particular type of wireless communication system, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
sending from a drift network element to a serving network element a request that comprises an indication of a slot format for a fractional dedicated channel; and
in response to the request being granted, the drift network element setting the slot format of the fractional dedicated channel according to the indication so that the slot format of the fractional dedicated channel can be restructured by the drift network element in accordance with the request sent from the drift network element to the serving network element.

2. The method of claim 1, wherein the drift network element comprises a drift radio network controller, the serving network element comprises a serving radio network controller, the fractional dedicated channel is a fractional dedicated physical channel and the indication comprises a fractional dedicated physical channel slot format information element.

3. The method of claim 2, wherein the request is a PHYSICAL CHANNEL RECONFIGURATION REQUEST message and the request is granted by a PHYSICAL CHANNEL RECONFIGURATION COMMAND message received by the drift radio network controller from the serving radio network controller.

4. An apparatus comprising a processor and a memory storing a program; wherein the processor is configured with the memory and the program to cause the apparatus at least:
to send over a communications interface to a serving network element a request that comprises an indication of a slot format for a fractional dedicated channel;
and in response to the request being granted, to set the slot format of the fractional dedicated channel according to the indication so that the slot format of the fractional dedicated channel can be reconfigured for the serving network by the apparatus in accordance with the request sent from the apparatus to the serving network element.

5. The apparatus of claim 4, wherein the apparatus comprises a drift radio network controller, the serving network element comprises a serving radio network controller, the fractional dedicated channel is a fractional dedicated physical channel and the indication comprises a fractional dedicated physical channel slot format information element.

6. The apparatus of claim 5, wherein the request is a PHYSICAL CHANNEL RECONFIGURATION REQUEST message and the request is granted by a PHYSICAL CHANNEL RECONFIGURATION COMMAND message received at the apparatus from the serving radio network controller.

7. A method comprising:
receiving at a serving network element from a drift network element a request that comprises an indication of a slot format for a fractional dedicated channel; and
granting the request and the serving network element switching a slot format of the fractional dedicated channel to the slot format of the indication so that the slot format of the fractional dedicated channel can be restructured by the drift network element in accordance with the request sent from the drift network element to the serving network element.

8. The method of claim 7, wherein the drift network element comprises a drift radio network controller, the serving network element comprises a serving radio network controller, the fractional dedicated channel is a fractional dedicated physical channel and the indication comprises a fractional dedicated physical channel slot format information element.

9. The method of claim 8, wherein the request is a PHYSICAL CHANNEL RECONFIGURATION REQUEST message and the request is granted by a PHYSICAL CHANNEL RECONFIGURATION COMMAND message sent from the serving radio network controller to the drift radio network controller.

10. A memory tangibly storing a program of computer readable instructions comprising:
code executed in response to receiving at a serving network element from a drift network element a request that comprises an indication of a slot format for a fractional dedicated channel, for granting the request and the serving network element switching a slot format of the fractional dedicated channel to the slot format of the indication so that the slot format of the fractional dedicated channel can be restructured by the drift network element in accordance with the request sent from the drift network element to the serving network element.

11. An apparatus comprising a processor and a memory storing a program; wherein the processor is configured with the memory and the program to cause the apparatus at least:
to receive over a communications interface from a drift network element a request that comprises an indication of a slot format for a fractional dedicated channel;
and to send over the communications interface a grant of the request and is further configured to switch a slot format of the fractional dedicated channel to the slot format of the indication so that the slot format of the fractional dedicated channel can be restructured by the drift network element in accordance with the request sent from the drift network element over the communications interface.

12. The apparatus of claim 11, wherein the apparatus comprises a serving radio network controller, the drift network element comprises a drift radio network controller, the fractional dedicated channel is a fractional dedicated physical channel and the indication comprises a fractional dedicated physical channel slot format information element.

13. The apparatus of claim 12, wherein the request is a PHYSICAL CHANNEL RECONFIGURATION REQUEST message and the request is granted by a PHYSICAL CHANNEL RECONFIGURATION COMMAND message sent from the apparatus to the serving radio network controller.

14. A method comprising:
receiving at a drift network element from a serving network element a message that comprises an indication of a slot format for a fractional dedicated channel; and
using the indication to determine the slot format of the fractional dedicated channel and sending a reply to the message to indicate the determined slot format of the fractional dedicated channel so that the slot format of the fractional dedicated channel can be restructured in accordance with the message.

15. The method of claim 14, wherein the drift network element is a drift radio network controller, the serving network element is a serving radio network controller, the fractional dedicated channel is a fractional dedicated physical channel, and the indication is a fractional dedicated physical channel slot format information element.

16. The method of claim 15, wherein the respective message and reply are selected from the group: RADIO LINK SETUP REQUEST and RADIO LINK SETUP RESPONSE; RADIO LINK ADDITION REQUEST and RADIO LINK ADDITION RESPONSE; RADIO LINK RECONFIGURATION REQUEST and RADIO LINK RECONFIGURA- TION RESPONSE; and RADIO LINK RECONFIGURATION PREPARE and RADIO LINK RECONFIGURATION READY.

17. The method of claim 16, wherein at least one of the message and reply comprises a fractional dedicated physical channel frame offset information element that indicates offset of a frame of the fractional dedicated physical channel relative to a common control physical channel, the method further comprising the drift radio network controller setting timing of the fractional dedicated physical channel according to the received fractional dedicated physical channel frame offset information element.

18. The method of claim 15, further comprising the drift radio network controller re-configuring the fractional dedicated physical channel in a Node B according to the determined slot format.

19. An apparatus comprising a processor and a memory storing a program, wherein the processor is configured with the memory and the program to cause the apparatus at least:
- to receive from a serving network element a message that comprises an indication of a slot format for a fractional dedicated channel; and
- to use the indication to determine the slot format of the fractional dedicated channel and to send a reply to the message to indicate the determined slot format of the fractional dedicated channel format so that the slot format of the fractional dedicated channel can be restructured in accordance with the message.

20. The apparatus of claim 19, wherein the apparatus comprises a drift radio network controller, the serving network element is a serving radio network controller, the fractional dedicated channel is a fractional dedicated physical channel, and the indication is a fractional dedicated physical channel slot format information element.

21. The apparatus of claim 20, wherein the respective message and reply are selected from the group: RADIO LINK SETUP REQUEST and RADIO LINK SETUP RESPONSE; RADIO LINK ADDITION REQUEST and RADIO LINK ADDITION RESPONSE; RADIO LINK RECONFIGURATION REQUEST and RADIO LINK RECONFIGURATION RESPONSE; and RADIO LINK RECONFIGURATION PREPARE and RADIO LINK RECONFIGURATION READY.

22. The apparatus of claim 21, wherein at least one of the message and reply comprises a fractional dedicated physical channel frame offset information element that indicates offset of a frame of the fractional dedicated physical channel relative to a common control physical channel, and wherein the processor is further configured to set timing of the fractional dedicated physical channel according to the received fractional dedicated physical channel frame offset information element.

23. The apparatus of claim 19, wherein the processor with the memory and the program is further configured to cause the apparatus at least to re-configure the fractional dedicated physical channel in a Node B according to the determined slot format.

24. A method comprising:
- sending from a serving network element to a drift network element a message that comprises an indication of a slot format for a fractional dedicated channel; and
- receiving a reply to the message indicating that the slot format of the fractional dedicated channel has been restructured in accordance with the message.

25. The method of claim 24, wherein the drift network element is a drift radio network controller, the serving network element is a serving radio network controller, the fractional dedicated channel is a fractional dedicated physical channel, and the indication is a fractional dedicated physical channel slot format information element.

26. The method of claim 25, wherein the respective message and reply are selected from the group: RADIO LINK SETUP REQUEST and RADIO LINK SETUP RESPONSE; RADIO LINK ADDITION REQUEST and RADIO LINK ADDITION RESPONSE; RADIO LINK RECONFIGURATION REQUEST and RADIO LINK RECONFIGURATION RESPONSE; and RADIO LINK RECONFIGURATION PREPARE and RADIO LINK RECONFIGURATION READY.

27. The method of claim 26, wherein at least one of the message and reply comprises a fractional dedicated physical channel frame offset information element that indicates offset of a frame of the fractional dedicated physical channel relative to a common control physical channel.

28. An apparatus comprising a processor and a memory storing a program, wherein the processor is configured to cause the apparatus at least:
- to send to a drift network element a message that comprises an indication of a slot format for a fractional dedicated channel; and
- to receive a reply to the message indicating that the slot format of the fractional dedicated channel has been restructured in accordance with the message.

29. The apparatus of claim 28, wherein the apparatus comprises a serving radio network controller, the drift network element is a drift radio network controller, the fractional dedicated channel is a fractional dedicated physical channel, and the indication is a fractional dedicated physical channel slot format information element.

30. The apparatus of claim 29, wherein the respective message and reply are selected from the group: RADIO LINK SETUP REQUEST and RADIO LINK SETUP RESPONSE; RADIO LINK ADDITION REQUEST and RADIO LINK ADDITION RESPONSE; RADIO LINK RECONFIGURATION REQUEST and RADIO LINK RECONFIGURATION RESPONSE; and RADIO LINK RECONFIGURATION PREPARE and RADIO LINK RECONFIGURATION READY.

31. The apparatus of claim 28, wherein at least one of the message and reply comprises a fractional dedicated physical channel frame offset information element that indicates offset of a frame of the fractional dedicated physical channel relative to a common control physical channel.

* * * * *